M. M. NEWSAM.
COOKER.
APPLICATION FILED JAN. 13, 1908.
923,690.
Patented June 1, 1909.
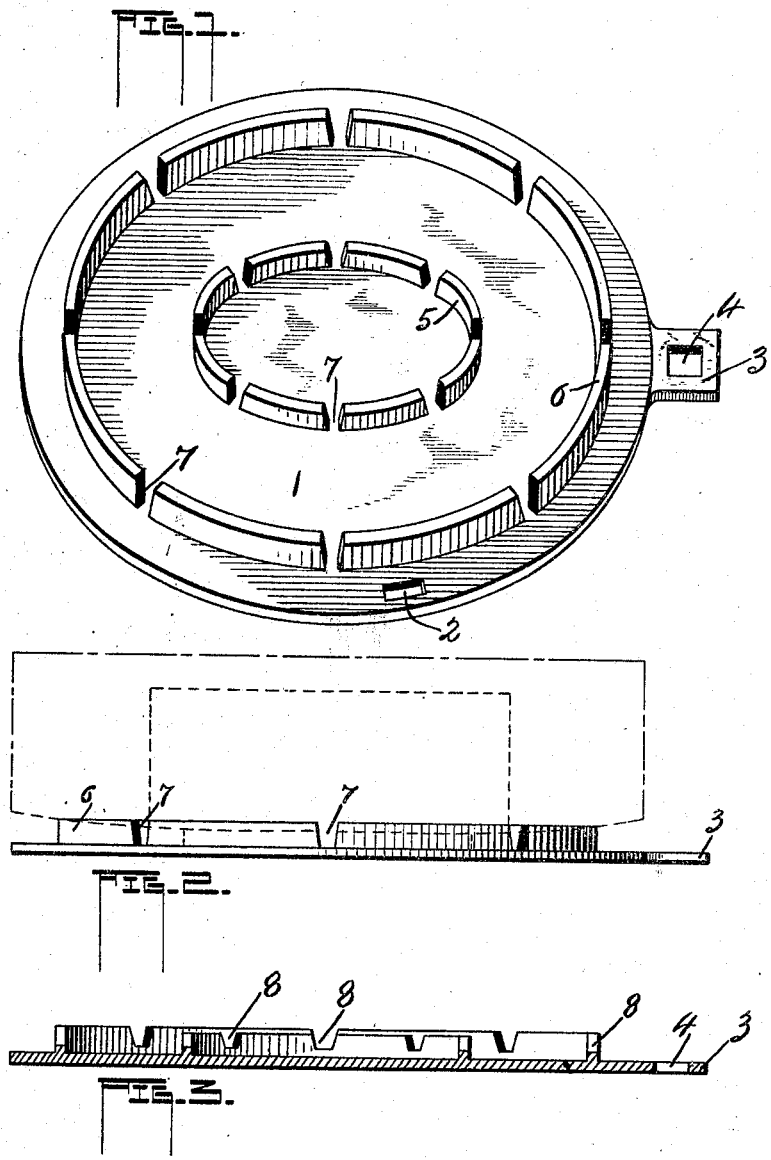

UNITED STATES PATENT OFFICE.

MINNIE M. NEWSAM, OF KENNEY, ILLINOIS.

COOKER.

No. 923,690.  Specification of Letters Patent.  Patented June 1, 1909.

Application filed January 13, 1908. Serial No. 410,638.

*To all whom it may concern:*

Be it known that I, MINNIE M. NEWSAM, a citizen of the United States, residing at Kenney, in the county of Dewitt and State of Illinois, have invented certain new and useful Improvements in Cookers; and I do hereby declare that the following is a full, clear, and exact description of the invention, which will enable others skilled in the art to which it appertains to make and use the same.

This invention has reference to certain new and useful improvements in cookers, having for its object, a cooker to be used on different kinds of stoves, and which, if desired, may be interchangeably used, first as a stove-lid and then as a cooker.

The invention consists of a metallic plate preferably of circular design and from one surface of which projects or extends a plurality of annular flanges or rings, preferably two, one rather small in diameter and the other much larger in diameter, and in depth greater than the inner ring and both of said rings provided with slots or openings through which it is intended air will circulate. Said plate is provided with an opening in which a lifter may be inserted for removing or replacing same, and the plate also has an offstanding portion perforated to provide a finger-hold to enable the plate to be lifted by hand and also to be lifted by a lifter being inserted into said opening.

That the invention may be more fully understood, reference is had to the accompanying drawings, in which:—

Figure 1 is a perspective of my improved cooker, showing the same with the finger-hold attached and also with an opening in the plate; if used interchangeably as a cooker and stove lid, the finger-hold is omitted; Fig. 2 is an edge view of my improved cooker shown in Fig. 1, and in dotted lines is shown the manner of supporting cooking utensils, such as pans thereon; Fig. 3 is a cross section through a cooker similar to Fig. 1, except that the slots or openings in the rings extend only part way down into said rings, whereas, in Fig. 1 the slots separate the rings into a plurality of sections.

Like numerals of reference indicate corresponding parts throughout the figures.

The numeral 1 designates the plate, which may be of suitable diameter to fit the openings in the tops of cook stoves. It is preferable that the plate be a solid plate as shown and be provided with a lifter opening 2 near its outer edge, and also with the extension pieces 3, having the opening 4, which latter opening provides a finger-hold. The device may be interchangeably used as a stove lid or cooker.

Projecting upwardly or extending outwardly at right angles with one surface of the plate 1 are a plurality of rings or flanges 5 and 6 constituting utensil supports. The former much smaller in diameter than the latter, and not only smaller, as shown, but also of less depth. And each of said rings are provided with a plurality of openings or slots, referred to as 7 in Fig. 1 and 8 in Fig. 3. The slots 7 are the full depth of the rings, separating each ring into a plurality of sections, while the slots 8 extend only part way down into said rings, as shown.

Providing the plate with a plurality of rings different in diameter, enables me to accommodate the cooker to different sizes of utensils or pans, as shown in Fig. 2, and by making the outer ring higher than the inner ring accommodates the cooker to utensils or pans having rounded bottoms. In this way, a round bottom utensil or pan may be placed on the cooker and rest as securely as a flat bottom utensil or pan. If the rings were of the same depth a round bottom pan or other utensil placed on the rings would have a tendency to tilt and possibly upset.

Making the cooker interchangeable as a cooker and stove-lid, it takes the place of a back lid, and it only needs to be turned upside down and placed on the forward portion of the stove to serve as a cooker.

As a cooker, it has many advantages, being as useful as a double-boiler and cheaper in cost of construction, such cooker having for its main object the cooking of such articles of food as milk, rice, oysters, fruit-butters, oat-meal and in fact, all such as are easily burned when being prepared, with little or no burning and very quickly; the slots or openings in the rings of the plate allowing fresh air to circulate through such slots or openings and beneath the utensil or pan and thereby distribute the heat uniformly beneath said utensil or pan.

Having thus fully described my invention what I claim and desire to secure by Letters Patent of the United States, is:—

An article of the class described comprising, a plate, a pair of supports each support being formed of spaced arc-shaped flanges projecting from the same face of said plate, said supports being arranged concentrically, the outer support being of greater depth than the inner support, the intersecting spaces between said flanges constituting air passages, and a perforated lug offstanding from said plate whereby the same may be held where used as a cooker, said plate adapted to be reversed and used as a stove-lid and having a perforation near its marginal edge whereby to be lifted when used as a stove-lid.

In testimony whereof I affix my signature, in presence of two witnesses.

MINNIE M. NEWSAM.

Witnesses:
LAURA GAUL,
C. F. LANE.